United States Patent [19]
Higgins

[11] Patent Number: 5,255,595
[45] Date of Patent: Oct. 26, 1993

[54] COOKIE MAKER

[75] Inventor: David T. Higgins, Lee's Summit, Mo.

[73] Assignee: The Rival Company, Kansas City, Mo.

[21] Appl. No.: 854,431

[22] Filed: Mar. 18, 1992

[51] Int. Cl.5 .............................................. A47J 37/00
[52] U.S. Cl. ....................................... 99/378; 99/372; 219/438; 219/445; 219/524
[58] Field of Search .................. 99/372, 374, 376–380, 99/389; 219/436, 438, 439, 524, 525, 445, 457–459, 462, 464

[56] References Cited

U.S. PATENT DOCUMENTS

| | | | |
|---|---|---|---|
| 1,405,043 | 1/1922 | Kruesheld | 99/378 |
| 1,563,353 | 12/1925 | Forshee . | |
| 1,659,774 | 2/1928 | Hicks | 219/459 |
| 1,737,620 | 12/1929 | Talbot | 99/380 |
| 1,947,124 | 2/1934 | Clauss . | |
| 2,791,960 | 5/1957 | Pietropinto . | |
| 2,817,744 | 12/1957 | Free | 219/438 |
| 3,669,006 | 6/1972 | Lee, Sr. . | |
| 4,150,609 | 4/1979 | McClean | 99/372 |
| 4,178,500 | 12/1979 | Brindöpke | 219/524 |
| 5,062,356 | 11/1991 | Frankowski . | |

FOREIGN PATENT DOCUMENTS

| | | | |
|---|---|---|---|
| 2900302 | 4/1979 | France | 99/372 |
| 55205 | 5/1935 | Norway | 219/459 |

Primary Examiner—Harvey C. Hornsby
Assistant Examiner—Mark Spisich
Attorney, Agent, or Firm—Willian Brinks Olds Hofer Gilson & Lione

[57] ABSTRACT

A cookie maker includes a housing having a lid and a base, a heat conducting element supported within the lid of the housing, a cookie pan disposed within the base of the housing, and a heating element supported within the housing and operative to heat the cookie pan. The cookie pan and the heat conducting element cooperate to define a baking cavity having a height in the range of 0.5 inches to 2 inches.

25 Claims, 3 Drawing Sheets

COOKIE MAKER

BACKGROUND OF THE INVENTION

This invention relates generally to the field of cookie makers, and particularly to portable cookie makers for household use.

U.S. Pat. No. 1,563,353 to Forshee describes an electric cookie baker having a plurality of cooperating baking surfaces. Cookie dough is placed in the various molds of one of the cooperating baking surfaces for baking. U.S. Pat. No. 2,791,960 to Pietropinto discloses a cookie making appliance provided with a top plate having a series of openings therein. Embossing or printing disks may be placed within the openings to create cookies having various designs.

Portable cookie makers for household use are desirable because they allow small quantities of fresh cookies to be made quickly. When using a conventional oven, it is prudent to bake a large batch of cookies. Otherwise, due to the necessity of preheating and maintaining the large volume of oven space at a constant baking temperature, the energy waste is substantial. Additionally, the time required to bake cookies in conventional ovens is substantial (typically around 30 minutes). Thus, instead of being a spontaneous endeavor, cookie making usually requires advance planning. Portable cookie makers overcome these disadvantages by allowing cookies to be baked in less than half the time required for conventional ovens, and by allowing a small number of cookies to be made energy efficiently.

Also, people often desire a variety of cookies instead of just a large number of the same type cookie. Portable cookie makers allow small quantities of a variety of cookies to be made within a short time. Thus, within the time required for a conventional oven to bake one batch of cookies, a person may have made and enjoyed a small number of several different types of cookies. Furthermore, the portable cookie maker of the present invention allows cookies of different sizes and shapes to be made.

It is, therefore, an object of the present invention to provide a portable cookie maker that allows small quantities of cookies to be baked quickly and energy efficiently.

It is another object of the present invention to provide a cookie maker having a baking cavity for baking cookies.

It is still another object of the present invention to provide a cookie maker having numerous embossed cookie pans for making cookies of different sizes and shapes.

SUMMARY OF THE INVENTION

According to a first aspect of the present invention, a portable cookie maker is provided including a housing having a lid and a base, a heat conducting element supported within the lid, a cookie pan disposed within the base, the cookie pan and the heat conducting element cooperating to define a baking cavity having a height in the range of 0.5 inches to 2 inches, and a heating element supported within the housing and operative to heat the cookie pan.

According to a second aspect of the present invention, there is provided a method of baking cookies comprising the following steps: providing a portable cookie maker comprising a housing having a lid and a base, a heat conducting element supported within the lid, a cookie pan disposed within the base, the cookie pan and the heat conducting element cooperating to define a baking cavity, and a heating element supported within the housing and operative to heat the cookie pan; placing at least one portion of cookie dough on the cookie pan; baking the at least one portion of cookie dough in the portable cookie maker such that the cookie dough bakes in the baking cavity without contacting the heat conducting element; and removing the at least one cookie from the portable cookie maker.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
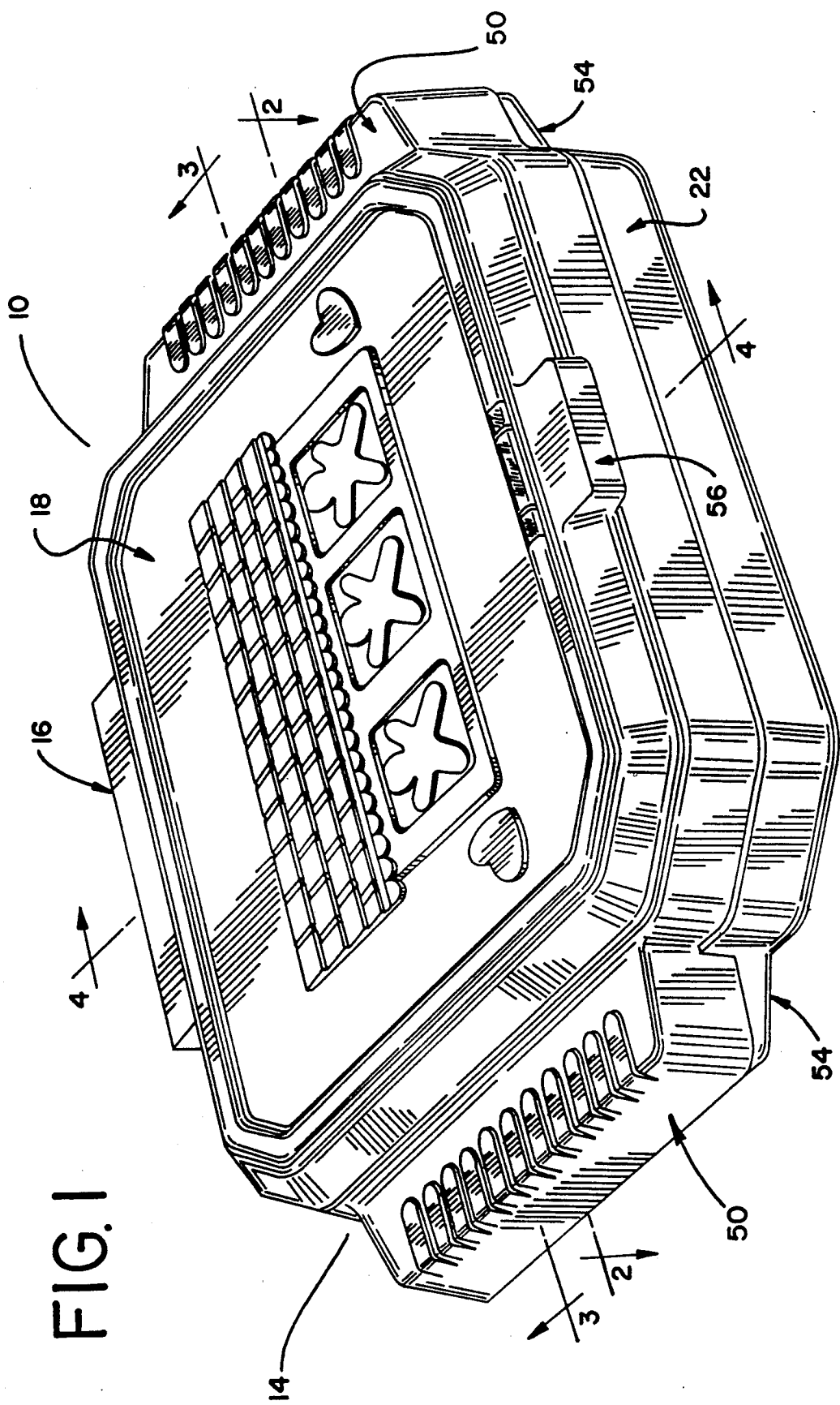
FIG. 1 is a perspective view of a portable cookie maker which incorporates a presently preferred embodiment of the present invention.
Figure 2:
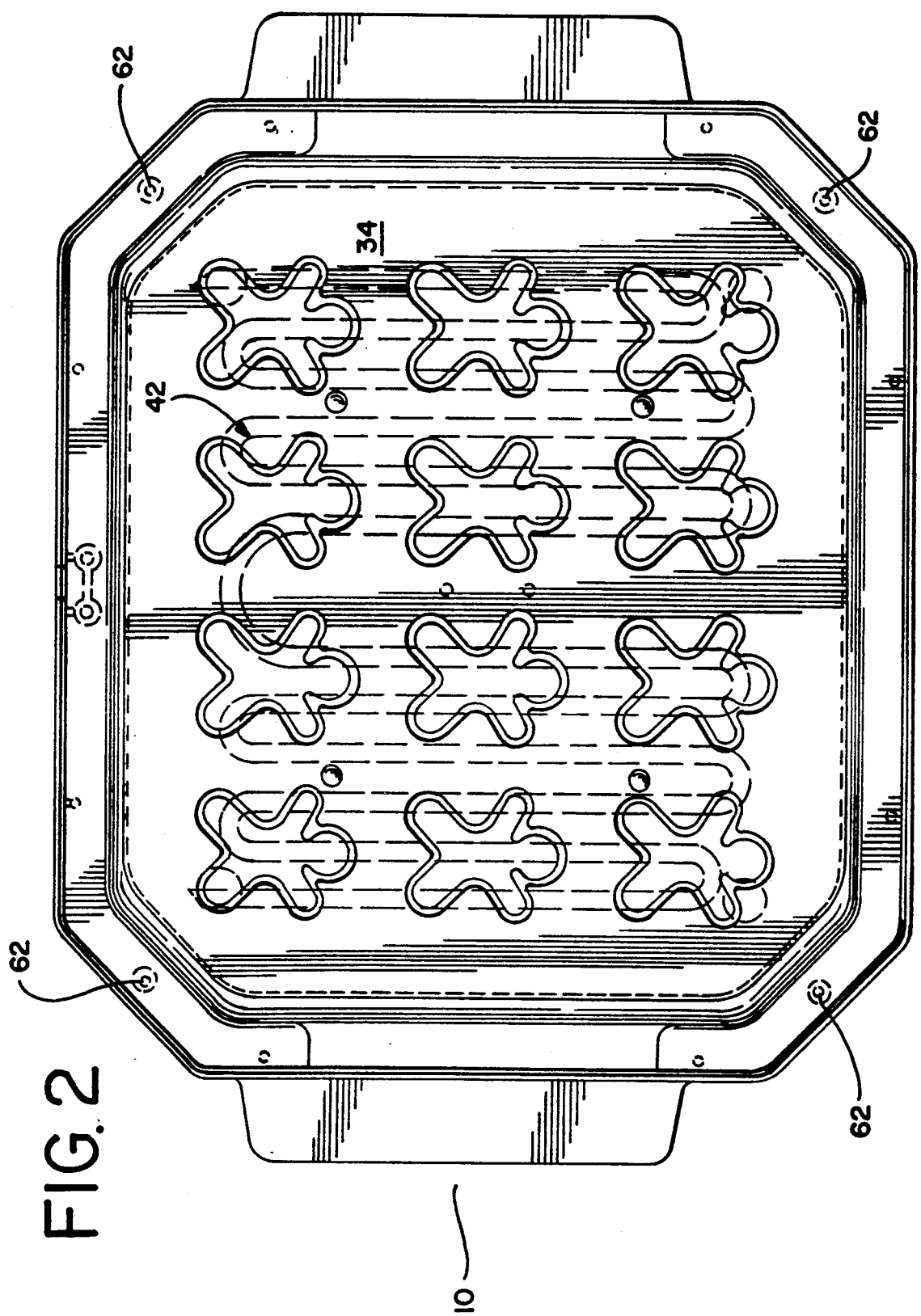
FIG. 2 is a cross-sectional view taken along line 2—2 of FIG. 1.

As shown in FIGS. 1-4, the presently preferred embodiment 10 of the portable cookie maker includes a housing 14 having a lid 18 and a base 22, two grooved heat conducting elements 26, 30, a cookie pan 34, two heating elements 38, 42, and two backplates 70, 74.

Figure 3:
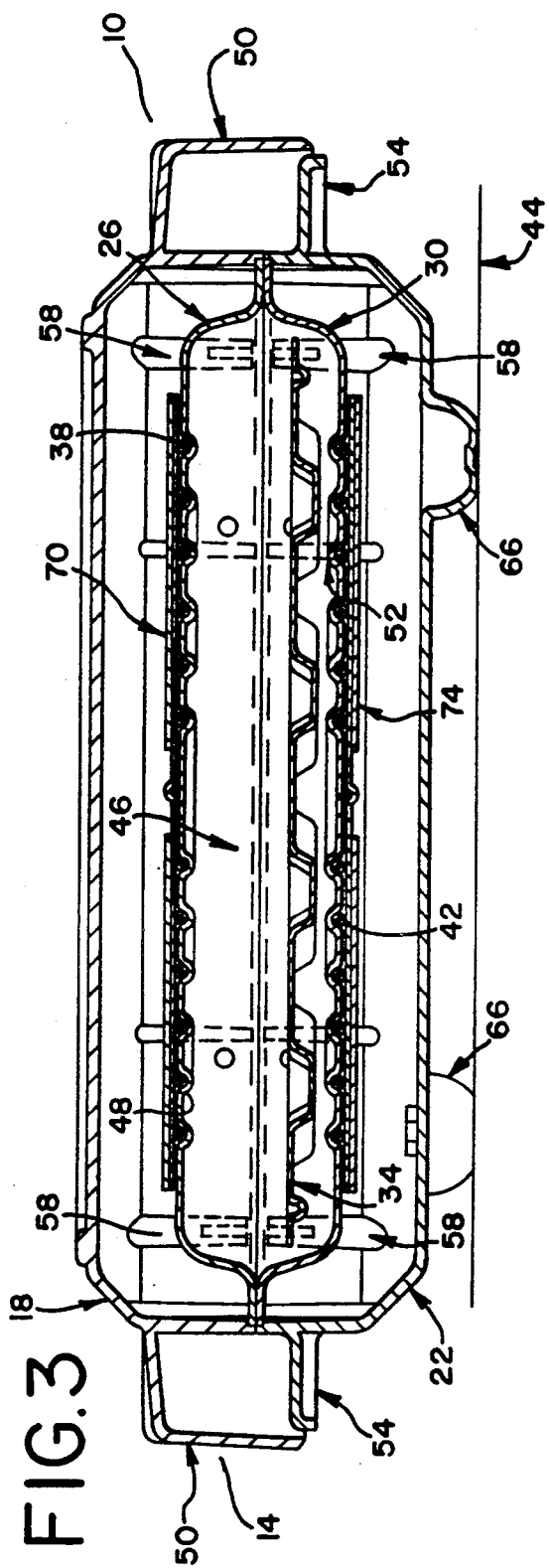
FIG. 3 is a cross-sectional view taken along line 3—3 of FIG. 1.
Figure 4:
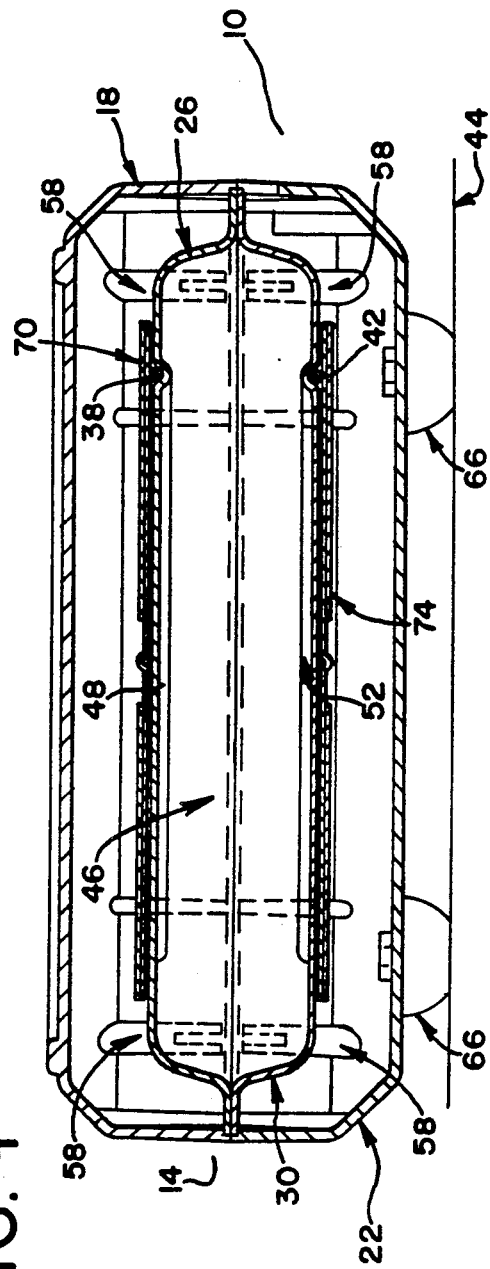
FIG. 4 is a cross-sectional view taken along line 4—4 of FIG. 1.

As best shown in FIG. 3, the first heat conducting element 26 is supported within the lid 18 of the housing 14 and the second heat conducting element 30 is supported within the base 22 of the housing 14. The cookie pan 34 is supported above the second heat conducting element 30, within the base 22. Alternately, the cookie pan 34 may be positioned to rest upon the second heat conducting element 30. The first heating element 38 is secured to the first heat conducting element 26 such that it rests within the groove 48 of the first heat conducting element 26, and the second heating element 42 is secured to the second heat conducting element 30 in like fashion. The heating elements 38, 42 are secured to the respective heat conducting elements 26, 30 by means of backplates 70, 74 riveted or otherwise secured to the heat conducting elements 26, 30. As shown, the backplates 70, 74 are positioned such that the heating elements 38, 42 are disposed between the backplates 70, 74 and the heat conducting elements 26, 30.

To maintain the portable cookie maker 10 at a temperature that is safe to the touch, the housing 14 is preferably formed of a suitable heat-insulating material. In the preferred embodiment, the housing 14 is formed of glass-filled thermoset polyester.

The cookie pan 34 may be a flat sheet or it may be a sheet embossed with molds of different shapes and sizes to allow cookies of various shapes and sizes to be made. The term "cookie pan" is defined broadly to include any sheet, plate, or heavy, cast material capable of supporting cookies. The cookie pan 34 may comprise any material suitable for the application. Preferably, the cookie pan 34 comprises steel having a non-stick coating thereon.

The heating elements 38, 42 may be of any electric type, including cal-rod and tubular sheath heating elements. Preferably, however, the heating elements 38, 42 are rope-type heating elements.

In the preferred and alternate embodiments, the first heat conducting element 26 and the cookie pan 34 cooperate to define a baking cavity 46 therebetween. The baking cavity 46 allows cookies to bake and rise without contacting the first heat conducting element 26., The baking cavity 46, therefore, allows cookies to be baked without contacting a top baking surface, or without being disposed between two contacting baking surfaces. The baking cavity 46 may be of any suitable height. However, in the preferred embodiment, the baking cavity 46 is 0.5 to 2 inches in height. The height of the baking cavity 46 is measured between the highest point of the cookie pan 34 and the lowest point of the first heat conducting element 26.

The heat conducting elements 26, 30 may be formed of any suitable material, including heavy-gauge aluminum and aluminized light-gauge steel, or shaped in any suitable configuration. However, to minimize the weight and the cost of the portable cookie maker, it is preferred that the heat conducting elements 26, 30 are formed of light-gauge aluminum. Additionally, allowance for the expansion of the heat conducting elements 26, 30 is preferably designed into the portable cookie maker 10, as is known in the art.

The backplates 70, 74 operate, as discussed above, to secure the heating elements 38, 42 to the respective heat conducting elements 26, 30. The backplates 70, 74 further operate to shield the housing from the heat that is radiated by the heating elements 38, 42. Preferably, to minimize the weight of the portable cookie maker 10, the backplates 70, 74 are formed of aluminum or steel.

In the preferred embodiment, the lid 18 and base 22 of the housing 14 are pivotally connected by a hinge to permit ease of access into the interior of the portable cookie maker 10. A stop 16 is provided to maintain the lid 18 in a substantially upright position. Alternately, however, the housing 14 may be constructed in any suitable manner to permit access to the interior of the portable cookie maker 10.

The housing 14 may comprise handles for opening and/or carrying the portable cookie maker 10. The preferred embodiment of the present invention includes two side handles 50 and a front handle 56 for lifting the lid 18 of the housing 14, and two lower handles 54 for positioning the portable cookie maker 10 on an operating surface 44. Alternately, handles (not shown) may be integrally formed with the cookie pan 34 and fashioned to extend between the heat conducting elements 26, 30 and beyond the housing 14, or the handles may be formed upright such that they fit within the baking cavity 46.

Additionally, the portable cookie maker 10 may include a thermostat (not shown) for regulating the operating temperature of the portable cookie maker 10 and a pilot light (not shown) for indicating when the portable cookie maker 10 is in use. The pilot light may be wired such that it remains activated as long as the portable cookie maker 10 is plugged in, or it may be wired into the thermostat such that it activates when the heating elements are energized. An open leaf-type thermostat is preferred.

In the preferred embodiment, the heat conducting elements 26, 30 are supported in the housing 14 through mounts 58 integrally formed with the housing 14. The heat conducting elements 26, 30 are secured to the mounts 59 by a screw and tubular spacer or insulating washer combination (not shown). The screws pass through holes 62 present in the heat conducting elements 26, 30 and terminate in threaded holes (not shown) in the mounts 58. The screws extend through the tubular spacers or washers, which are positioned between the heat conducting elements 26, 30 and the mounts 58. The tubular spacers or washers operate to support the heat conducting elements 26, 30 at a distance removed from the lid 18 and the base 22, respectively. Furthermore, the spacers and screws insulate the housing 14 from the heat generated by the heating elements 38, 42. The spacers and screws may be formed of any suitable material that is characterized by low thermal conductivity. Preferably, however, the tubular spacers and screws are formed of steel. The insulating washers are preferably formed of silicone rubber.

The cookie maker 10 may include a number of feet 66 for supporting the cookie maker 10 above the operating surface 44. The feet 66 may be integrally molded with the housing 14 or they may comprise separate units connected to the housing 14. The feet 66 may include rubber pads to prevent the cookie maker 10 from sliding on the operating surface 44.

The portable cookie maker 10 includes a wiring compartment (not shown) accessible by way of a removable cover. Furthermore, the portable cookie maker 10 may include a storage mount (not shown) for storing the portable cookie maker 10 in an upright position.

In an alternate embodiment, the portable cookie maker 10 may be configured with only one heat conducting element 26 and one heating element 38. In such an embodiment, the cookie pan 34 would be supported within the base 22 of the housing 14 and the second heat conducting element 30 and the second heating element 42 would be deleted. The heating element 38, depending on its location within the housing 14, may directly or indirectly heat the cookie pan 34.

Additionally, the heat conducting elements 26, 30 may be configured without grooves. In this embodiment, the heating elements 38, 42 may be secured to the heat conducting elements 26, 30 by means of the backplates 70, 74 discussed above, or the heating elements 38, 42 may be staked to the heat conducting elements 26, 30 by means of U-shaped channels (not shown). The heating elements 38, 42 may also be supported between the heat conducting elements 26, 30 and the housing 14.

The following paragraphs describe the operation of the elements and features of the portable cookie maker 10. Additionally, the materials used to construct the various elements of the portable cookie maker 10 are discussed.

Depending on the type of cookie pan 34 used, cookie dough is either arranged on a flat sheet or placed within the molds of an embossed sheet. The lid 18 is lifted via side handles 50 or front handle 54, and the cookie pan is placed within the base 22. The lid 18 is closed and the cookie maker 10 is activated. If desired, the portable cookie maker 10 may be pre-heated for approximately one minute. The heat conducting elements 26, 30 are heated by the heating elements 38, 42. The first heat conducting element 26 radiates heat to the cookie dough through the baking cavity 46, whereas the second conducting plate, depending on whether the cookie pan 34 rests directly on the second heat conducting element 30 or is supported above the second heat conducting element 30, either heats the cookie pan through conduction or convection. To maintain the cookie maker at the desired baking temperature of 350° F., the heat conducting elements 26, 30 are preferably maintained at a temperature of approximately 400° F. At this temperature, the time required for baking cookies in the cookie maker 10 is approximately 4 to 10 minutes. Furthermore, by heating only a small volume of space, as contrasted with the large volume required to be heated in conventional ovens, the cookie maker 10 of the preferred embodiment bakes small quantities of cookies energy efficiently.

Grooved heat conducting elements 26, 30 are preferred because they allow for greater surface contact with the heating elements 38, 42. This greater surface contact results in improved heat distribution throughout the heat conducting elements 26, 30 and, therefore, throughout the cookie maker 10. This phenomenon further results in even baking of the cookie dough, thereby preventing some cookies from being overbaked and others underbaked. Additionally, the groove 52 in the second heat conducting element 30 allows air to circulate between the groove 52 and the cookie pan 34. Thus, if the cookie pan 34 is positioned to rest upon the second heat conducting element 30, the cookie pan 34 will be heated by conduction from the second heat conducting element 30 and by convection from the air circulating through the groove 52 in the second heat conducting element 30. Because the groove 52 on the second heat conducting element 30 may create a localized "hot spot" at the point it contacts the cookie pan 34, the air circulation feature provided by the groove 52 of the second heat conducting element 30 helps to insure a uniform baking temperature along the cookie pan 34.

To minimize the weight of the portable cookie maker 10 and to maximize heat transfer from the heating elements to the cookie dough, the heat conducting elements 26, 30 may be formed from either light-gauge aluminum approximately 0.050 inches in thickness or coated steel approximately 0.032 inches in thickness. The total area of each heat conducting element is approximately 90 square inches. The preferred rope-type heating elements 38, 42 are each approximately 5 to 6 feet in active length, with a combined total wattage of 800 to 1000 Watts. The total wattage is split between the heating elements 38, 42, with the first heating element 38 having a higher wattage. The power-density for each heat conducting element 26, 30 is, therefore, 4 to 5½ Watts/in$^2$. The combination of high-wattage heating elements with low power-density heat conducting elements 26, 30 furnishes the portable cookie maker 10 with uniform heating for baking.

Alternately, the portable cookie maker 10 may include heat conducting elements formed and/or cast of heavy-gauge aluminum, and tubular sheath or cal-rod heating elements. Tubular sheath and cal-rod heating elements are high wattage units. However, the large mass of the heavy-gauge aluminum heat conducting elements would permit the heat conducting elements to dissipate the correspondingly high power-density. The disadvantages of heavy-gauge aluminum heat conducting elements include being more expensive and heavier than light-gauge aluminum heat conducting elements.

The method of baking cookies comprises providing a portable cookie maker 10 as described above, placing at least one portion of cookie dough on the cookie pan 34, baking the at least one portion of cookie dough in the portable cookie maker 10 such that the cookie dough bakes and rises in the baking cavity 46 without contacting the heat conducting element 26, and removing the at least one cookie from the portable cookie maker 10. The method for baking cookies may include the step of baking a plurality of cookies at one time. Furthermore, as discussed above, the cookie pan 34 may be embossed to allow cookies of different sizes and shapes to be made, and the time required for baking cookies in the portable cookie maker 10 may be no more than about 4 to 10 minutes.

The following materials have been found suitable for use in the preferred embodiment of the invention: the housing 14 may be formed of MB 2000-10 PS thermoset polyester supplied by MAR-BAL; the thermostat may be a HF-368 model supplied by Bimet; and the heating element may be a rope-type heating element supplied by HeatTech.

It should be appreciated that the cookie maker of this invention may be sized and configured for a variety of applications. The embodiments described above are to be considered in all respects only as illustrative and not restrictive. The scope of the invention is indicated by the following claims rather than by the foregoing description. All changes which come within the meaning and range of equivalency of the claims are to be embraced within their scope.

I claim:

1. A portable cookie maker, comprising:
   a) a housing comprising a lid and a base;
   b) a heat conducting element supported within the lid of said housing and comprising a groove therein;
   c) a cookie pan disposed within the base of said housing, said cookie pan and said heat conducting element cooperative to define a baking cavity having a height in the range of 0.5 inches to 2 inches; and
   d) a heating element secured within the groove of said heat conducting element and operative to heat said cookie pan.

2. The cookie maker of claim 1 wherein said heating element is supported between the lid of said housing and said heat conducting element.

3. The cookie maker of claim 1, further comprising:
   a) a second heat conducting element supported within the base of said housing between said cookie pan and the base; and
   b) a second heating element supported between the base of said housing and the second heat conducting element.

4. The cookie maker of claim 3:
   a) wherein said second heat conducting element is shaped to define a groove, the groove operative to allow heating air to circulate between said second heat conducting element and said cookie pan; and
   b) wherein said second heating element is secured within the groove of said second conducting element.

5. The cookie maker of claim 1 wherein said heating element is secured to said heat conducting element by means of a backplate secured to said heat conducting element, said heating element disposed between the backplate and said heat conducting element.

6. The cookie maker of claim 1 wherein said cookie pan is embossed to allow cookies of different sizes and shapes to be made.

7. The portable cookie maker of claim 1 wherein the lid and the base of the housing are pivotally connected.

8. The portable cookie maker of claim 1, further comprising:

a) at least one handle for carrying the portable cookie maker; and b) a plurality of support feet for supporting the cookie maker above an operating surface.

9. The portable cookie maker of claim 1 wherein the portable cookie maker may be stored in an upright position.

10. The portable cookie maker of claim 1 wherein said heat conducting element has a power-density of about 4 to 5½ Watts/in².

11. The portable cookie maker of claim 1 wherein said heating element is a rope-type heating element.

12. The portable cookie maker of claim 11 wherein the active length of said heating element is no more than about 5 to 6 feet.

13. The portable cookie maker of claim 1 wherein said heat conducting element is formed of light-gauge aluminum.

14. The portable cookie maker of claim 1 wherein the time required for baking cookies in the portable cookie maker is no more than about 4 to 10 minutes.

15. The portable cookie maker of claim 1 wherein coolies bake within the baking cavity without contacting said heat conducting element.

16. The portable cookie maker of claim 1 wherein the height of the baking cavity is 1.25 inches.

17. A portable cookie maker, comprising:
a) a housing comprising a lid and a base;
b) two oppositely disposed, grooved heat conducting elements positioned within said housing, the first heat conducting element supported within the lid of said housing, the second heat conducting element supported within the base of said housing;
c) a cookie pan disposed within the base of said housing at a position above the second heat conducting element, said cookie pan and the first heat conducting element cooperative to define a baking cavity having a height in the range of 0.5 inches to 2 inches; and
d) two heating elements, each secured within the groove of a respective one of said two oppositely disposed, grooved heat conducting elements.

18. The cookie maker of claim 17 wherein the groove of said second heat conducting element is operative to allow heating air to circulate between said second heat conducting element and said cookie pan.

19. The cookie maker of claim 17 wherein each of said two heating elements is secured to a respective one of said two oppositely disposed heat conducting elements by a backplate secured to each of said two oppositely disposed heat conducting elements, each of said two heating elements disposed between the backplate and a respective one of said two oppositely disposed heat conducting elements.

20. The cookie maker of claim 17 wherein said cookie pan is embossed to allow cookies of different sizes and shapes to be made.

21. The portable cookie maker of claim 17 wherein cookies bake within the baking cavity without contacting the first heat conducting element.

22. A portable cookie maker, comprising:
a) a housing comprising a lid and a base;
b) a heat conducting element supported within the lid of said housing and comprising a groove therein;
c) a cookie pan disposed within the base of said housing, said cookie pan and said heat conducting element cooperative to define a baking cavity having a height in the range of 0.5 inches to 2 inches; and
d) a heating element secured within the groove of said heat conducting element by means of a backplate secured to said heat conducting element and operative to heat said cookie pan.

23. The portable cookie maker of claim 22 wherein said heating element is supported between the lid of said housing and said heat conducting element.

24. The portable cookie maker of claim 22, further comprising:
a) a second heat conducting element supported within the base of said housing between said cookie pan and the base; and
b) a second heating element supported between the base of said housing and the second heat conducting element.

25. The portable cookie maker of claim 22 wherein cookies bake within the baking cavity without contacting said heat conducting element.

* * * * *

UNITED STATES PATENT AND TRADEMARK OFFICE
CERTIFICATE OF CORRECTION

PATENT NO. : 5,255,595
DATED : October 26, 1993
INVENTOR(S) : DAVID T. HIGGINS

It is certified that error appears in the above-indentified patent and that said Letters Patent is hereby corrected as shown below:

ON THE TITLE PAGE

Under the heading "FOREIGN PATENT DOCUMENTS", in the first line, please delete "2900302" and substitute therefor --2400302--.

Column 3, line 9, after "26." please delete ",".

Col. 7, line 2, please delete "coolies" and substitute therefor --cookies--.

Signed and Sealed this

Thirty-first Day of May, 1994

Attest:

BRUCE LEHMAN

*Attesting Officer*  *Commissioner of Patents and Trademarks*